Patented Apr. 7, 1936

2,036,208

UNITED STATES PATENT OFFICE 2,036,208

COMPLEX COMPOUNDS OF ORGANIC MERCAPTO COMPOUNDS

Adolf Feldt, Berlin-Charlottenburg, Walter Schoeller, Berlin-Westend, and Hans-Georg Allardt, Teltow, Germany, assignors to Schering-Kahlbaum A. G., Berlin, Germany, a corporation of Germany No Drawing. Application April 8, 1935, Serial No. 15,308. In Germany March 29, 1934

6 Claims. (Cl. 260—11)

This invention relates to organic mercapto compounds, and more particularly to complex compounds of organic mercapto compounds and a method of producing the same. The present application is closely related to the copending Patent No. 2,006,003 dated June 25, 1935, Serial No. 627,098, filed July 30, 1932, wherein the broad subject matter is disclosed and this application constitutes a specific modification thereof.

According to the process described in said copending patent complex compounds of organic mercapto compounds are obtained by reacting organic mercapto compounds of heavy metals or other elements the sulfide of which is neither soluble in nor decomposed by water, with mercapto compounds or their alkali or alkaline earth metal salts.

In the further development of this process it has been found that complex compounds can be obtained in the same manner by reacting heavy metal and the like compounds of glutathione with organic or inorganic mercapto compounds or their salts. Said reaction products are particularly effective and at the same time well compatible.

An especially suitable starting material is the auro glutathionate the physiological activity of which is considerably enhanced by combining the same with mercapto compounds. Of course, other metal compounds may also be used for the purpose of the present invention, such as silver, bismuthum, copper, nickel, cobalt, lead, antimony, arsenic, and the like compounds.

As mercapto compounds which are to be combined with said starting materials, there may be used glutathione or other amino acids or polypeptides of similar structure which contain mercapto groups, such as the ergothionine and the like, or aliphatic, aromatic or heterocyclic mercapto compounds, such as cystein, mercapto propionic acid, thiosalicylic acid, 4-amino-2-mercapto benzene-1-sulfonic acid, xantogenic acid and the like, or thio-substituted carbohydrates, such as thioglucose, thiogalactose, thiocellobiose and the like, or even inorganic thio compounds, such as thiosulfates and the like. Of course, the mercapto compounds themselves may be used or preferably their alkali salts.

The products obtained according to the present application differ from those mentioned in the copending application Serial No. 627,098 by reason of their high therapeutic acitivity which recommends them as excellent remedies in the treatment of infectious diseases.

The following examples serve to illustrate the invention without, however, limiting the same to them:

Example 1

5 parts of the di-sodium salt of auro glutathione are dissolved in 9.14 cc. of n thiosulfate solution. On adding 50 parts of alcohol to the solution the complex compound precipitates. It is filtered off by suction and washed with 80% alcohol. The compound is a light yellow powder, easily soluble in water, insoluble in ether and chloroform and only slightly soluble in alcohol. It has the general formula

$C_{10}H_{14}N_3O_6(SAu)Na_2.Na_2S_2O_3$

Example 2

As in Example 1, 5 parts of the di-sodium salt of auro glutathione are dissolved in a small quantity of water and reacted with 2.36 parts of sodium thioglucose (1 mol.) By the addition of alcohol to said solution the complex compound of the components is obtained. It is of light yellow color and readily soluble in water but insoluble in organic solvents. It has the general formula 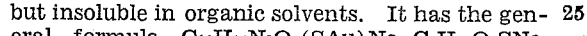 $C_{10}H_{14}N_3O_6(SAu)Na_2.C_6H_{11}O_5SNa$.

Example 3

6 parts of sodium gold glutathionate and 3.5 parts of glutathione are dissolved in 5 parts of water. On adding alcohol to this solution, the complex compound of the components precipitates. It is a colorless powder which is readily soluble in water with a slightly acid reaction. By the addition of the equivalent amount of alkali a sodium salt is obtained which reacts slightly alkaline and is difficultly soluble in organic solvents. It has the general formula

$C_{10}H_{15}N_3O_6(SAu)Na.C_{10}H_{16}N_3O_6SNa$

Example 4

5.47 parts of di-sodium salt of gold glutathione are dissolved in 50 parts of water to which solution 13.1 parts (4 mol.) of the mono sodium salt of glutathione are added. The complex compound obtained therefrom in the manner described in the preceding examples shows particularly valuable therapeutic qualities. It has the general formula

$C_{10}H_{14}N_3O_6(SAu)Na_2.4C_{10}H_{16}N_3O_6SNa$

The reaction may be carried out not only in aqueous solution, but also in organic solvents, such as alcohol, ethylene glycol and the like.

The complex compound obtained according to this example exhibits against relapsing fever a therapeutic index of 1:20 on assaying by means of the mouse test, thus representing a considerable progress as compared with the products obtained to the copending application Serial No. 627,098.

Of course, many variations and changes may be made in the reaction conditions, starting materials and their proportions etc. by those skilled in the art in accordance with the principles set forth herein and in the claims annexed hereto.

What we claim is:

1. Double compounds having the formula A.(B)$_n$ wherein A is glutathione in the mercapto modification, the H-atom of its mercapto group being substituted by a metal, the sulfide of which is neither soluble in nor decomposed by water, while B is a compound containing a mercapto group, the H-atom of which mercapto group may be substituted by a metal taken from the class consisting of alkali and alkaline earth metals, $n$ being an integer, these compounds being readily soluble in water, dissolving only with difficulty in organic solvents and having a high therapeutical value.

2. Double compounds having the formula A.(B)$_n$ wherein A is glutathione in the mercapto modification, the H-atom of its mercapto group being substituted by a metal, the sulfide of which is neither soluble in nor decomposed by water, while B is a carbohydrate containing a mercapto group, the H-atom of which mercapto group may be substituted by a metal taken from the class consisting of alkali and alkaline earth metals, $n$ being an integer, these compounds being readily soluble in water, dissolving only with difficulty in organic solvents and having a high therapeutical value.

3. Double compounds having the formula A.(B)$_n$ wherein A is glutathione in the mercapto modification, the H-atom of its mercapto group being substituted by gold, while B is a compound containing a mercapto group, the H-atom of which mercapto group may be substituted by a metal taken from the class consisting of alkali and alkaline earth metals $n$ being an integer, these compounds being readily soluble in water, dissolving only with difficulty in organic solvents and having a high therapeutical value.

4. Double compounds having the formula A.(B)$_n$ wherein A is glutathione in the mercapto modification, the H-atom of its mercapto group being substituted by gold, while B is a carbohydrate containing a mercapto group, the H-atom of which mercapto group may be substituted by a metal taken from the class consisting of alkali and alkaline earth metals, $n$ being an integer, these compounds being readily soluble in water, dissolving only with difficulty in organic solvents and having a high therapeutical value.

5. Double compounds having the formula A.(B)$_n$ wherein A is sodium glutathionate in the mercapto modification, the H-atom of its mercapto group being substituted by gold, while B is glutathione in the mercapto modification, the H-atom of its mercapto group being substituted by a metal taken from the class consisting of alkali and alkaline earth metals, $n$ being an integer, these compounds being readily soluble in water, dissolving only with difficulty in organic solvents and having a high therapeutical value.

6. Double compounds having the formula A.(B)$_n$ wherein A is a glutathione compound in the mercapto modification taken from the class consisting of glutathione and its salts, the H-atom of its mercapto group being substituted by a metal, the sulfide of which is neither soluble in nor decomposed by water, while B is a compound containing a mercapto group, the H-atom of which mercapto group may be substituted by a metal taken from the class consisting of alkali and alkaline earth metals, $n$ being an integer, these compounds being readily soluble in water, dissolving only with difficulty in organic solvents and having a high therapeutical value.

WALTER SCHOELLER.
ADOLF FELDT.
HANS-GEORG ALLARDT.